Oct. 2, 1956 M. I. ROTHMAN 2,765,443

MODULATION SYSTEM

Filed Aug. 10, 1951 3 Sheets-Sheet 1

INVENTOR

MAX I. ROTHMAN,

BY Hall & Houghton

ATTORNEY

Oct. 2, 1956 M. I. ROTHMAN 2,765,443

MODULATION SYSTEM

Filed Aug. 10, 1951 3 Sheets-Sheet 2

INVENTOR

MAX I. ROTHMAN,

BY Hall & Houghton

ATTORNEY

Oct. 2, 1956 M. I. ROTHMAN 2,765,443

MODULATION SYSTEM

Filed Aug. 10, 1951 3 Sheets-Sheet 3

INVENTOR

MAX I. ROTHMAN,

BY Hall & Houghton

ATTORNEY

United States Patent Office 2,765,443

Patented Oct. 2, 1956

2,765,443

MODULATION SYSTEM

Max I. Rothman, Alamogordo, N. Mex., assignor to Marshal R. Sanguinet, Mathis, Tex.

Application August 10, 1951, Serial No. 241,174

16 Claims. (Cl. 332—38)

This invention relates to devices for impressing modulation on a radio frequency carrier and particularly to a method and means for accomplishing this objective with a minimum of expense, space and weight, and a maximum of efficiency, utility and fidelity. The invention is particularly applicable in the field of radio communication wherein a need exists for efficient radio transmitting equipment that is economical of electronic components and simple and versatile in its operation, and wherein a need exists for a simple means for generation of high audio power in a simple and efficient manner.

A general object of the invention is to provide an improved method and means for impressing modulation on a radio frequency carrier.

Another object is to provide improved circuitry in the design of a class "C" radio frequency amplifier in such manner as to prevent vacuum tube damage under off-resonance conditions.

Yet another object is to provide improved methods and means for generating controlled carrier modulated radio frequency energy.

Still another object is to provide improved methods and means for generating high power audio outputs.

In essence the invention relates to an amplitude modulation system employing an amplifier tube whose conductivity or gain is directly varied by the modulation signal. Further, to provide high efficiency, a portion of the modulated carrier signal is rectified and applied to the amplifier tube in a manner to further increase the modulation effect, i. e. for positive going modulation signal a further increase in amplifier gain and for negative going modulation signal a further decrease in gain. In one embodiment of the invention a screen grid class "C" amplifier tube is used, the carrier signal being applied to the control grid, and the modulation signal being applied in a manner to vary the screen grid voltage. A portion of the modulated carrier is rectified and filtered and connected to the screen grid of the amplifier tube. A shunt tube is connected across the rectified voltage on the screen grid and the modulation signal is connected to the shunt tube in a manner to directly vary its conductivity.

In other forms of the invention the same principles may be applied to push-pull carrier frequency amplification with half wave or full wave rectified modulation controlled feed-back, and the invention may be applied for feeding any suitable load, for example, a transmitting antenna, a transmitting cable circuit, or a rectifying circuit for producing high power audio-frequency output for public address systems or the like.

For a better understanding of the invention together with other objects and further features of novelty thereof reference is had to the following specification taken in connection with the accompanying drawings, wherein like parts are indicated by like reference numerals and in which.

Figure 1:
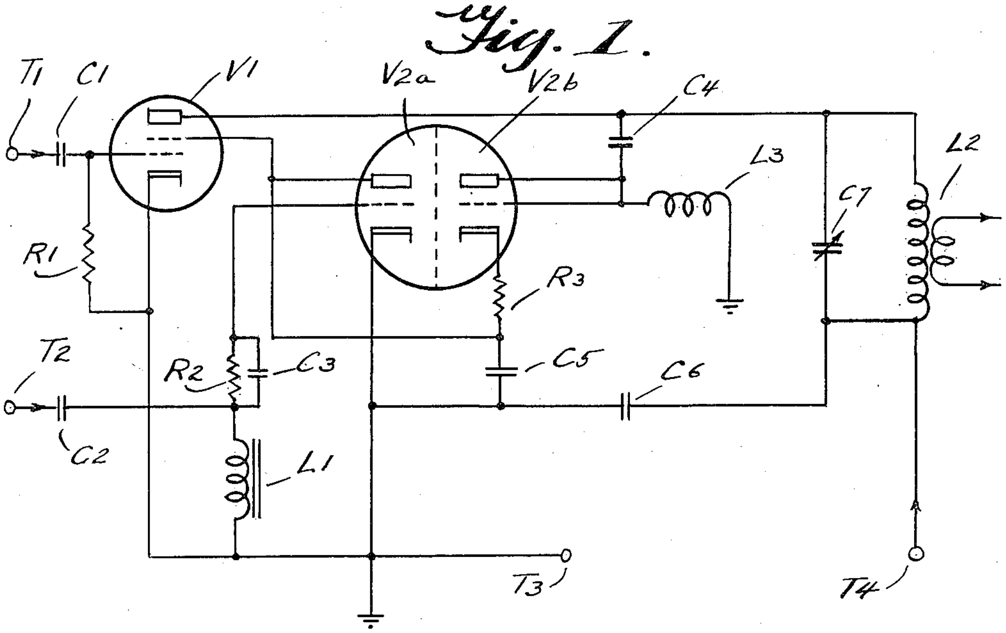
Fig. 1 is a schematic diagram of one embodiment.

In the form shown in Fig. 1, elements C1 through C7 are capacitors of values appropriate to their individual functions. Similarly items R1 through R3 are resistors; elements L1 through L3 are inductances; V1, V2*a* and V2*b* are vacuum tubes and T1 through T4 are terminal connection points.

In the arrangement illustrated in Fig. 1 the vacuum tube V1 may be any pentode or tetrode vacuum tube suitable for use as a class "C" radio frequency amplifier. The grid exciting energy for the tube V1 is connected at T1. The modulating energy is connected at T2. The "B" supply voltage is connected to terminal T4, with its negative side connected to T3. Screen voltage for the vacuum tube V1 is derived by rectifying a portion of the radio frequency energy in the tank circuit C7, L2. In Fig. 1, the rectifier used for this purpose is the triode V2*b* connected as a diode. The tube V2*a* is used to shunt to ground a portion of the screen energy supplied to the tube V1. The tube V2*a* in the form shown is a triode, the conductivity of which is directly varied by the modulation signal.

In the arrangement of Fig. 1 the R-C circuit made up of resistor R2 and capacitor C3 is employed to generate a D. C. bias voltage for supply to the grid of the shunt tube V2*a*. The time constant of resistance R2 and capacitance C3 is chosen for the desired degree of speech controlled carrier integration, i. e. the desired decay time of the carrier level after modulation ceases. The effect of this arrangement is to introduce average carrier level control utilizing regenerating effect to produce controlled carrier operation.

The arrangement produces regenerative reinforcement at the modulation frequency between the plate and screen circuits of amplifier V1, e. g. when the modulating voltage at C2 is negative going, shunt tube V2*a* becomes instantaneously less conductive allowing the screen voltage of amplifier V1 to rise. This causes the instantaneous carrier level in tank circuit L2, C7 to rise, thereby increasing the energy fed to rectifier V2*b* and its rectified output for screen supply to amplifier V1. Signal reinforcement also occurs for positive going modulation at C2. This regenerative action results in an extremely high modulation-power-gain with the effect that amplifier V1 may be modulated with very low modulation input at terminal T2. Controlled carrier operation is achieved in the invention by self-biasing action of R2, C3 which generates bias for shunt tube V2*a* only when modulating voltage is present at input terminal T2, thereby increasing the average carrier level when modulation is present.

The circuit may be modified by substituting for the biasing means R2, C3 other biasing means, for example a fixed bias sufficient to raise the carrier level to a point enabling it to be modulated both up and down by the audio modulation. The use of a fixed bias provides a constant carrier modulation system employing similar principles.

From the foregoing other modifications will be apparent to those skilled in the art. Thus, inductance L3 is not critical and may be replaced by a resistor of proper value. Furthermore, resistor R3 may be taken as representative of any element that is capable of offering an impedance to radio frequency energy e. g. an R. F. choke of appropriate value.

Thus, the preferred embodiment of the invention shown in Fig. 1 utilizes regenerative effect both for audio modulation and controlled carrier purposes, and from what has been said it will be apparent that either of these two functions may be accomplished individually with variations of the circuit. It is important to note that in the arrangement disclosed in Fig. 1 modulated regenerative feed back is accomplished at the modulation frequency and not at the radio frequency, no feed-back existing at the radio frequency. Within the principles of the invention other embodiments may be achieved to modulate the feed-back percentage by means other than the use of a shunt tube controlling screen voltage e. g. a grid control feed-back rectifier; transformer injected audio modulating the output of the feed-back rectifier etc.

Figure 2:
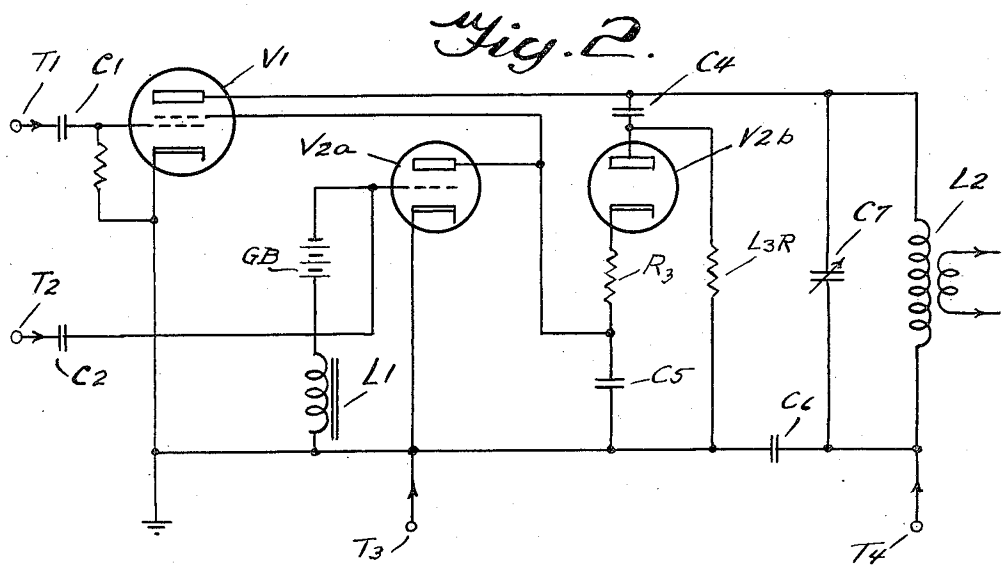
Fig. 2 is a modification thereof.

In the embodiment of the invention illustrated in Fig. 2 separate shunt and feed-back rectifier tubes are employed in lieu of the dual tube V2*a*, V2*b* illustrated in Fig. 1, and the employment of a resistor L3R and a fixed grid bias GB in lieu of the inductance L3 and the biasing means R2, C3 are also illustrated. As above indicated the fixed bias GB should be of a value calculated to bring the carrier level up to a point where it may be modulated both up and down by the audio modulation and this arrangement serves to produce a constant carrier modulation system with modulation controlled regenerative effect.

Figure 3:
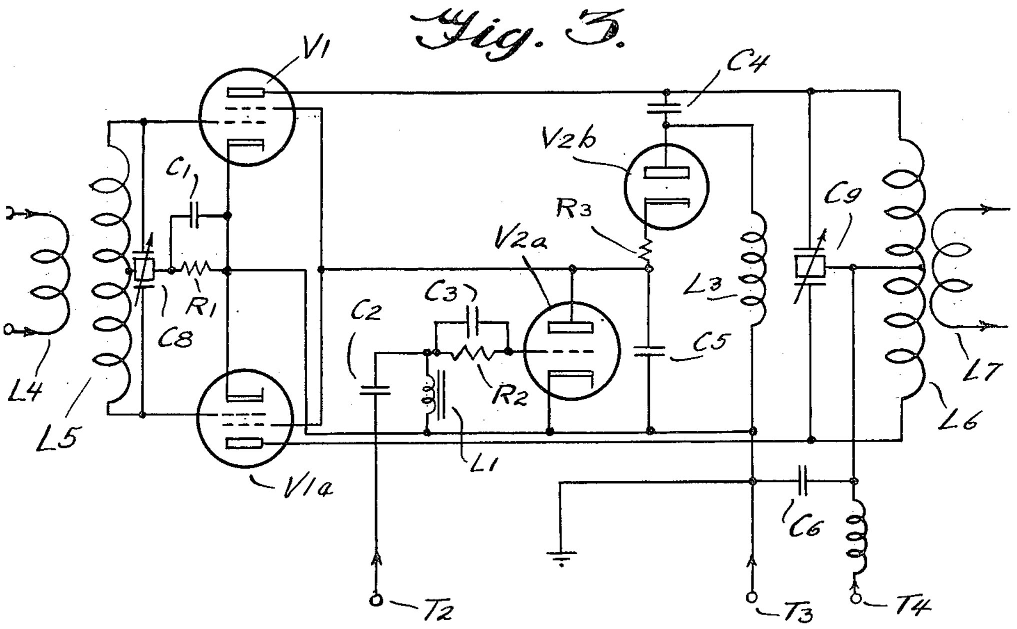
Figs. 3 and 4 are modifications applied to push-pull radio frequency amplification with half wave and full wave feed back rectification respectively.

In the embodiment shown in Fig. 3 the invention is adapted to a push-pull R. F. amplifier with half wave feed back rectification. The amplifier tubes V1, V1*a* have the carrier signal connected to their signal grids by way of input transformer L4, L5 arranged in push-pull and have their outputs connected to the push-pull tank circuit L6, C9 coupled to the output circuit L7 in any suitable manner. The halfwave rectifier V2*b* and the shunt tube V2*a* are associated with the output of tube V1 in the same manner described in connection with Figs. 1 and 2, except that the controlled screen potential produced by this combination is fed to the screen grids of amplifiers V1 and V1*a* connected in parallel.

Figure 4:
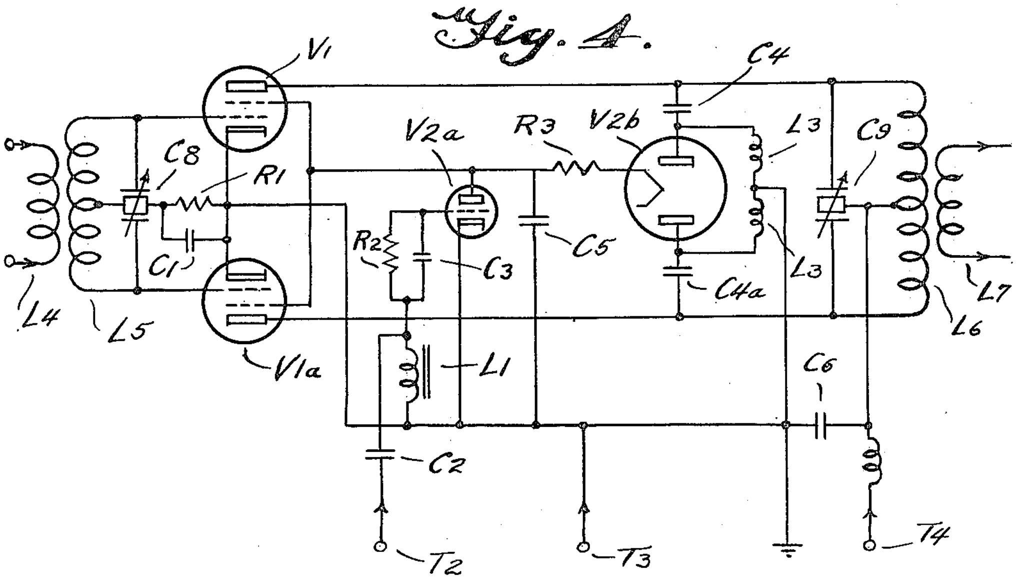

In the embodiment of Fig. 4 the push-pull amplifier circuits are substantially the same as in Fig. 3, but in this arrangement the rectifier V2*b* is a full wave rectifier connected to both sides of the tank circuit L6, C9 with appropriate duplication of the condenser C4 at C4*a*, and with the impedance L3 center tapped. The output of the full wave rectifier is connected to the shunt tube V2*a* in the same manner as previously described.

Figure 5:
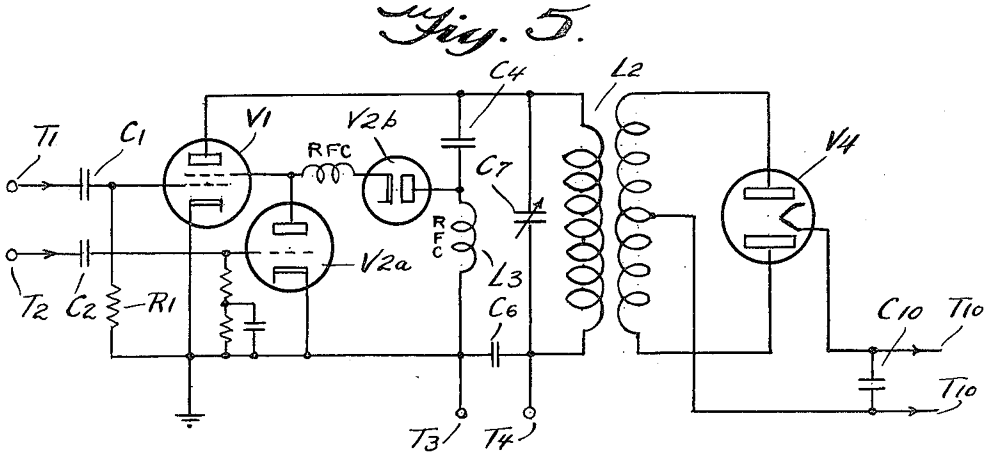
Fig. 5 is a modification illustrating the adaptation of the invention for the production of high power audio frequency outputs.

The embodiment shown in Fig. 5 illustrates an application of the invention for the efficient generation of extremely high audio power which may be of the order of several kilowatts. In this embodiment the circuit elements of the modulation controlled carrier wave amplifier are generally the same as those described in connection with Fig. 1 and the output is suitably coupled, herein by inductive coupling, to a full wave rectifier V4 including filter condenser C10 to produce high power audio output at the terminals T10.

In the preferred embodiments of the invention the system is self-regulating for different levels of plate power input. Accordingly, plate input may be varied over a wide range without affecting the modulation percentage or fidelity.

The invention also prevents excess plate current flow in the R. F. amplifier V1 or V1, V1*a* under off resonance conditions or grid excitation failure. This result is obtained because both these conditions result in reduced or zero R. F. output and therefore in reduced or zero screen voltage.

From the foregoing description it will be apparent that the present invention provides, broadly, a radio frequency input to a radio frequency stage of a translating circuit, demodulates a part of the output of said stage, regeneratively feeds the demodulated output to the radio frequency stage, and employs a modulating input to control the regenerative feed-back at the modulation frequency, and that the exemplary elements disclosed to perform the several steps in this method are illustrative, but not restrictive, of the broader aspects of the invention, wherefore the vacuum tubes and associated elements shown and described are to be taken as representative of various devices that may serve corresponding functions in systems of the type disclosed. Thus while there have been described what are at present preferred embodiments of the invention, it will be obvious to those skilled in electronic science that various changes and modifications may be made without departing from the invention. It is therefore to be understood that the exemplary embodiments hereindescribed are illustrative and not restrictive of the invention, the scope of the invention being defined in the appended claims. All modifications that come within the meaning and range of equivalency of the claims are therefore intended to be included therein.

I claim:

1. A system for effecting regenerative modulation of a carrier signal being amplified by a screen grid amplifier that comprises means for rectifying a portion of the output of the amplifier, means for deriving from said rectified portion a screen grid potential for said amplifier and feeding it back to said screen grid in phase with the output of said amplifier, and means employing the modulation signal to control the effective percentage of such feed back to said screen grid.

2. A system according to claim 1 in which said last named means includes means to control by-pass to ground of a part of said rectified portion proportional to said modulation signal.

3. A system according to claim 1 applicable to push-pull amplification in which said rectifying means is connected to rectify a portion derived from at least one side of the push-pull output of the amplifier and said screen grid potential deriving means is connected to supply screen grid potential for both sides of the push-pull amplifier.

4. A system according to claim 1 applicable to push-pull amplification in which said rectifying means is connected to rectify a portion derived from both sides of the push-pull output and said screen grid potential deriving means is connected to supply screen grid potential for both sides of the push-pull amplifier.

5. A system for generating high audio frequency power employing a carrier signal and an audio frequency modulation signal and comprising means for effecting regenerative modulation of the carrier signal under control of the modulation signal in accordance with the system of claim 1 and means for full wave rectifying the output of the modulation controlled regeneratively amplified carrier signal to produce a high power audio output.

6. A device of the class described comprising a screen grid amplifier and a grid controlled by-pass tube, means for impressing a carrier signal on the control grid of said amplifier, means for rectifying a part of the output of said amplifier and for impressing the rectified potential on the screen grid of said amplifier in phase with the output of said amplifier, means for impressing a modulation signal on the grid of said by-pass tube and means for connecting said by-pass tube to by-pass energy from the screen grid of said amplifier tube to the cathode thereof under control of said modulation signal, whereby regenerative modulation of said carrier signal is effected.

7. A device of the class described comprising a screen grid amplifier and a grid controlled by-pass tube, means for impressing a carrier signal on the control grid of said amplifier, means for rectifying a part of the output of said amplifier and for impressing the rectified potential on the screen grid of said amplifier in phase with the output of said amplifier, means for impressing on the grid of said by-pass tube a modulation signal and a D. C. bias voltage proportional to said signal, and means for connecting said by-pass tube to by-pass energy from the screen grid of said amplifier tube to the cathode thereof under control of said modulation signal and bias, whereby regenerative modulation and average carrier level control of said carrier signal is effected.

8. A device of the class described comprising a screen grid amplifier and a grid controlled by-pass tube, means for impressing the carrier signal on the control grid of said amplifier, means for rectifying and filtering a part of the output of said amplifier and applying the same to the screen grid of said amplifier tube in phase with the output of said amplifier, means for impressing on the grid of said by-pass tube the modulation signal and a D. C. bias voltage, and means for connecting said by-pass tube to by-pass energy from the screen grid of said amplifier tube to the cathode thereof under control of said grid applied voltages, whereby regenerative modulation of said carrier signal is effected.

9. In a regenerative amplifying modulator for a carrier signal produced by a screen grid amplifier, comprising means for receiving a portion of the output of the amplifier, means for rectifying said portion, means for deriving from said rectified portion a screen grid potential for said amplifier, a connection for applying said screen grid potential to the amplifier in phase with the output of said amplifier and means controlled by a modulation signal for varying the effective percentage of regenerative feedback of said rectified portion to said connection.

10. A high audio frequency power generator comprising a regenerative amplifying modulator according to claim 9, a full wave rectifier and means for coupling the output of said regenerative amplifying modulator to said rectifier for rectification thereby to produce a high power audio output.

11. A system for regeneratively modulating a radio frequency signal in accordance with a modulation signal that comprises means for supplying the radio frequency signal as input to a radio frequency stage of a translating circuit, means for demodulating a part of the output of said stage, means for regeneratively feeding the demodulated output to the radio frequency stage in phase with the output of said radio frequency stage, and means employing the modulation signal to control the regenerative feed back of the demodulated output in accordance with the modulation signal.

12. A modulator for modulating the output of a radio frequency screen grid amplifier having a carrier signal impressed on its control grid, said modulator comprising a grid controlled by-pass tube, means for receiving and rectifying a portion of the output of the amplifier, means for deriving a screen grid potential from said rectified portion including a connection for impressing said potential on the screen grid of the amplifier in phase with the output of said amplifier, means for impressing a modulation signal on the grid of said by-pass tube, and means for connecting said by-pass tube to by-pass a controlled part of the energy of said rectified portion to vary the derived screen grid potential under control of said modulation signal, whereby regenerated modulation of said carrier signal may be effected.

13. A regenerative modulator for a carrier signal produced by a screen grid amplifier comprising means for receiving and rectifying a portion of output derived from the amplifier, means for deriving from said rectified portion a screen grid potential for said amplifier, a connection for applying said screen grid potential to the amplifier in phase with the output of said amplifier, and means controllable by a modulation signal for varying the effective percentage of regenerative feed back of said rectified portion to said connection.

14. A modulator according to claim 9 in which the means for receiving a part of the output of the amplifier comprises a capacity coupling connectable to the output of the amplifier.

15. A system modulating a carrier signal being amplified by a screen grid amplifier that comprises means for rectifying a portion of the output of the amplifier, means for deriving a screen grid potential from said rectified portion and for impressing it on the screen grid of the amplifier in phase with the output of said amplifier, and means employing the modulation signal to control the by-passing of a part of the energy of the rectified portion to vary the derived screen grid potential under control of said modulation signal.

16. A system for modulating a carrier signal being amplified by a screen grid amplifier that comprises means for rectifying a portion of the output of the amplifier, means employing the modulation signal to modulate the rectified portion of the output, means for deriving a modulating screen grid potential from said modulated rectified portion, and means for applying said modulating screen grid potential to the screen grid of the amplifier in phase with the output of said amplifier.

References Cited in the file of this patent

UNITED STATES PATENTS

| | | |
|---|---|---|
| 2,031,639 | Finch | Feb. 25, 1936 |
| 2,070,666 | Llewellyn | Feb. 16, 1937 |
| 2,133,410 | Wirkler | Oct. 18, 1938 |
| 2,385,566 | De Guire | Sept. 25, 1945 |
| 2,431,471 | Ferguson | Nov. 25, 1947 |